United States Patent [19]

Yamada et al.

[11] Patent Number: 4,705,318

[45] Date of Patent: Nov. 10, 1987

[54] SEAT BACK RECLINING MECHANISM

[75] Inventors: Yukifumi Yamada; Takami Terada; Toshihito Miyagawa, all of Toyota, Japan

[73] Assignees: Aisin Seiki Kabushiki Kaisha; Toyota Jidosha Kabushiki Kaisha, both of Japan

[21] Appl. No.: 832,393

[22] Filed: Feb. 24, 1986

[30] Foreign Application Priority Data

Feb. 25, 1985 [JP]  Japan .............................. 60-26167[U]

[51] Int. Cl.$^4$ ............................................. B60N 1/02
[52] U.S. Cl. .................................... 297/362; 297/355; 188/77 W
[58] Field of Search ............... 297/361, 362, 374, 354, 297/355, 366, 367, 368, 369; 188/77 W, 77 R; 192/8 C, 12 BA, 17 D

[56] References Cited

U.S. PATENT DOCUMENTS

| | | |
|---|---|---|
| 3,972,563 | 8/1976 | Gustafsson . |
| 3,976,327 | 8/1976 | Wirtz et al. .......................... 297/366 |
| 4,113,303 | 9/1978 | Werner et al. . |
| 4,113,308 | 9/1978 | Werner et al. ...................... 297/362 |
| 4,181,357 | 1/1980 | Swenson et al. . |
| 4,195,884 | 4/1980 | Muhr et al. . |
| 4,335,917 | 6/1982 | Izuno et al. . |
| 4,576,412 | 3/1986 | Terada ................................ 297/362 |

FOREIGN PATENT DOCUMENTS

| | | | |
|---|---|---|---|
| 2620808 | 11/1977 | Fed. Rep. of Germany ... | 188/77 W |
| 3509211 | 9/1985 | Fed. Rep. of Germany ...... | 297/362 |
| 58-1255 | 10/1983 | Japan . | |
| 2059496 | 4/1981 | United Kingdom ................ | 297/362 |

Primary Examiner—Kenneth J. Dorner
Assistant Examiner—Mark W. Binder
Attorney, Agent, or Firm—Finnegan, Henderson, Farabow, Garrett & Dunner

[57] ABSTRACT

A seat back reclining mechanism for a vehicle seat includes an upper and lower brackets respectively secured to the seat back and the seat cushion. A reduction gear mechanism is provided between the upper and lower brackets for a stepless adjustment of the reclining angle. An actuating knob is located at one side of the seat cushion for the convenience of operation. A belt-sprocket type motion transmitting mechanism is provided between the actuating knob and the reduction gear mechanism for transmitting a rotation of the knob to the gear mechanism. In order to prevent the seat back from being inclined under the load applied by the passenger, a constraining device is provided for preventing the motion transmitting mechanism from transmitting the force from the reduction gear mechanism.

7 Claims, 5 Drawing Figures

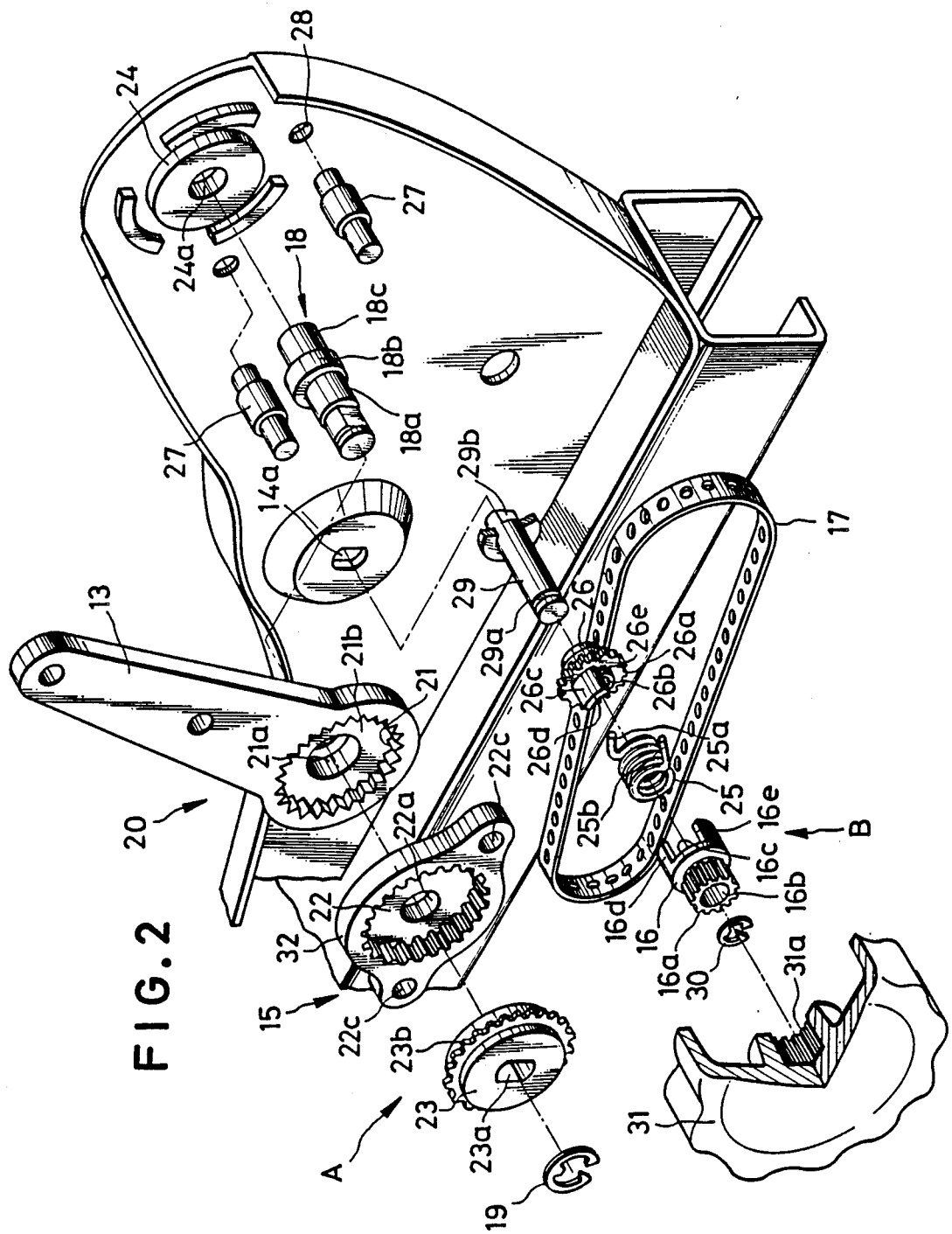

SEAT BACK RECLINING MECHANISM

BACKGROUND OF THE INVENTION

1. Field of the Invention

The present invention relates to vehicle seats, and more particularly to vehicle seats having seat back reclining mechanisms. More specifically, the present invention pertains to seat back reclining angle adjusting means for vehicle seats.

2. Description of the Prior Art

In Japanese utility model publication No. 58-1255, there is disclosed a vehicle seat having a seat back reclining mechanism which can provide a stepless adjustment of seat back reclining angle. The mechanism disclosed by the Japanese utility model includes an upper arm secured to the seat back and a lower arm secured to the seat cushion, the upper and lower arms being connected together through a speed reduction gear mechanism so that the upper arm can be inclined with respect to the lower arm through an actuation of the gear mechanism to obtain a desired reclining angle of the seat back. The speed reduction gear mechanism includes an internal gear provided on the upper arm and an external gear provided on the lower arm for meshing engagement with the internal gear. The external gear has teeth which are fewer than the number of teeth of the internal gear. The external gear also is carried by an eccentric shaft in an offset relation with respect to the internal gear. It is therefore possible to adjust steplessly tbe inclination angle of the upper arm with respect to the lower arm through a rotation of the eccentric shaft.

In this type of mechanism, the actuating knob is provided on the eccentric shaft so that it is located at a rearward side of the seat cushion. However, this particular location of the actuating knob is inconvenient to operate. It should further be noted that, in this type of conventional mechanism, the parts are held in the adjusted position under the frictional forces between teeth of the internal and external gears and between the eccentric shaft and bearing surfaces in the gears. In order to prevent the seat back from collapsing under the load of the passenger, it is required to provide suiiiciently high frictional forces, which will in turn require a high operating force.

SUMMARY OF THE INVENTION

It is therefore an object of the present invention to provide a seat back reclining mechanism which can provide a stepless adjustment of the seat back reclining angle but is free from the aforementioned problems.

Another object of the present invention is to provide a steplessly adjustable seat back reclining mechanism which is convenient and easy to operate.

A further object of the present invention is to provide a steplessly adjustable seat back reclining mechanism which has an actuating member provided at a side of the seat cushion for a convenient operation and can be operated with a small actuating force.

According to the present invention. the above and othez objects can be accomplished by a seat back reclining mechanism comprising an upper bracket securely provided on a seat back of a seat assembly, a lower bracket securely provided on a seat cushion of the seat assembly, an internal gear provided on one of the upper and lower brackets, an external gear provided on the other of the upper and lower brackets and having gear teeth smaller in number than the internal gear, an eccentric shaft carrying said internal and external gears in an eccentrically offset relationship so that the gears are held in meshing engagement at a circumferential region of the internal gear, the improvement comprising an actuating mechanism including a pivot shaft provided on said lower shaft, a first sprocket provided on said pivot shaft for rotation thereon and having an actuating knob, a second sprocket provided on said ecentric shaft to rotate therewith power transmitting means between said first and second sprockets, and constraining means provided between said first sprocket and said pivot shaft for preventing a rotation of said first sprocket under a force applied through the power transmitting means and said pivot shaft.

Acording to the present invention, the actuating knob can be located at any position convenient for operation and the rotation of the actuating knob is transmitted to the eccentric shaft through the power transmitting means. Further, the constraining means holds the seat back in the adjusted position against the force applied from the passenger to the seat back.

According to one aspect of the present invention, the constraining means includes a torsion coil spring wound around the pivot shaft. The torsion spring has opposit ends bent radially outward and received in a circumferential cutout formed in the actuating knob so that a rotation of the actuting knob causes an end of the cutout engage with one of the ends of the spring so that the one end of the spring is moved toward the other end wIlh the result that the coil spring is loosened on the pivot shaft. The first sprocket has a lug which is located between the ends of the spring so that a rotation of the first sprocket causes the lug to engage with one of the ends of the spring to make the one spring end away from the other with the result tbat tbe spring is tightened on the pivot shaft. The actuating knob may be mounted on the pivot shaft in such a manner that it can transmit a rotation to the first sprocket. The pivot shaft may be secured to the lower bracket in any known manner. For example, the pivot shaft may be formed with one end of a rectangular, elliptical, square on polygonal cross-sectional configuration, which is fitted to a correspondingly formed aperture in the lower bracket. Alternatively, it may be fixed to the lower bracket by fasteners or welding.

The above and other objects and features ot the present invention will become apparent from the following description of a preferred embodiment taking reference to the accompanying drawings.

BRIEF DESCRIPTION OF THE DRAWINGS

FIG. 2 is an exploded perspective view of the seat back reclining mechanism;

DESCRIPTION OF THE PREFERRED EMBODIMENT

Figure 1:
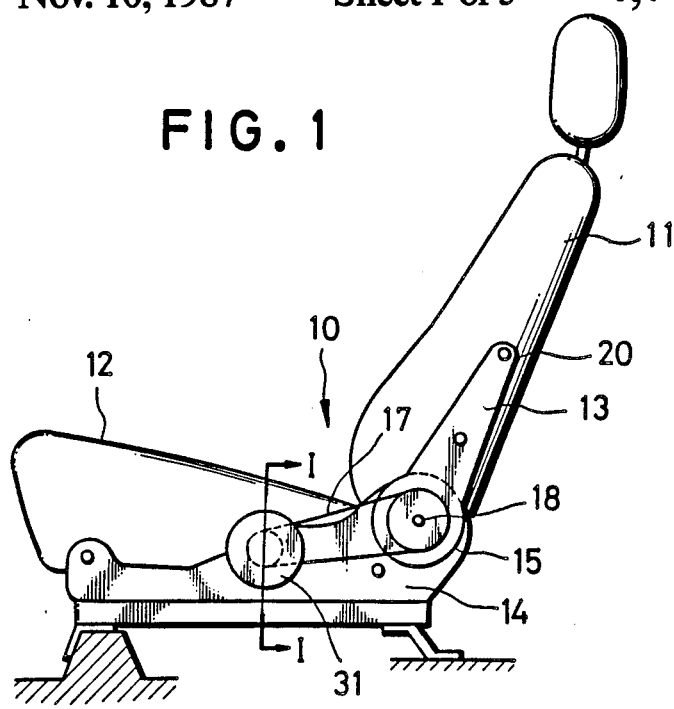
FIG. 1 is a side view of a vehicle seat having a seat back reclining mechanism in accordance with one embodiment of the present invention.

Referring to the drawings, particularly to FIG. 1, there is shown a vehicle seat 10 comprising a seat back 11 and a seat cushion 12. Between the seat back 11 and the seat cushion 12, there is a seat back reclining mechanism 20 including a speed reduction gear mechanism 15.

Figure 5:
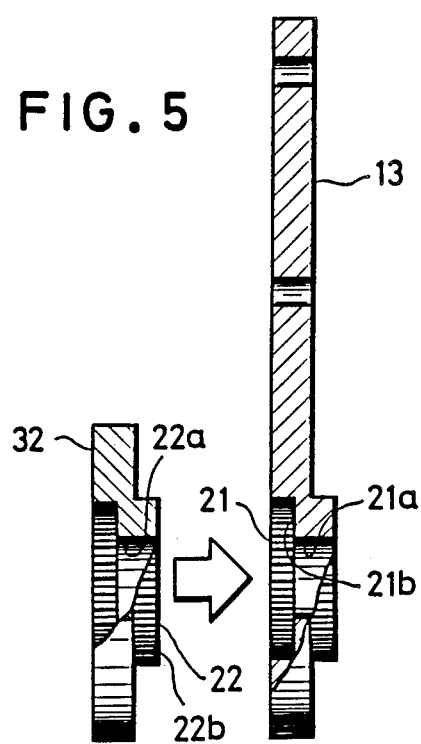
FIG. 5 is a sectional view of the upper bracket.
Figure 4:
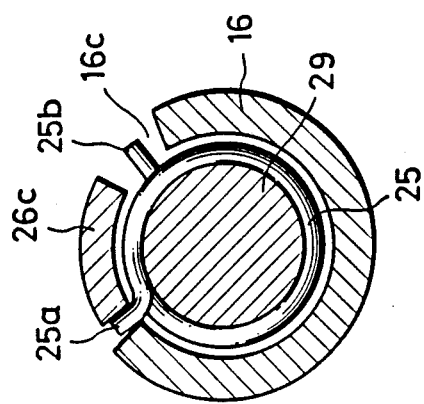
FIG. 4 is a sectional view taken along the line IV—IV in FIG. 3.
Figure 3:
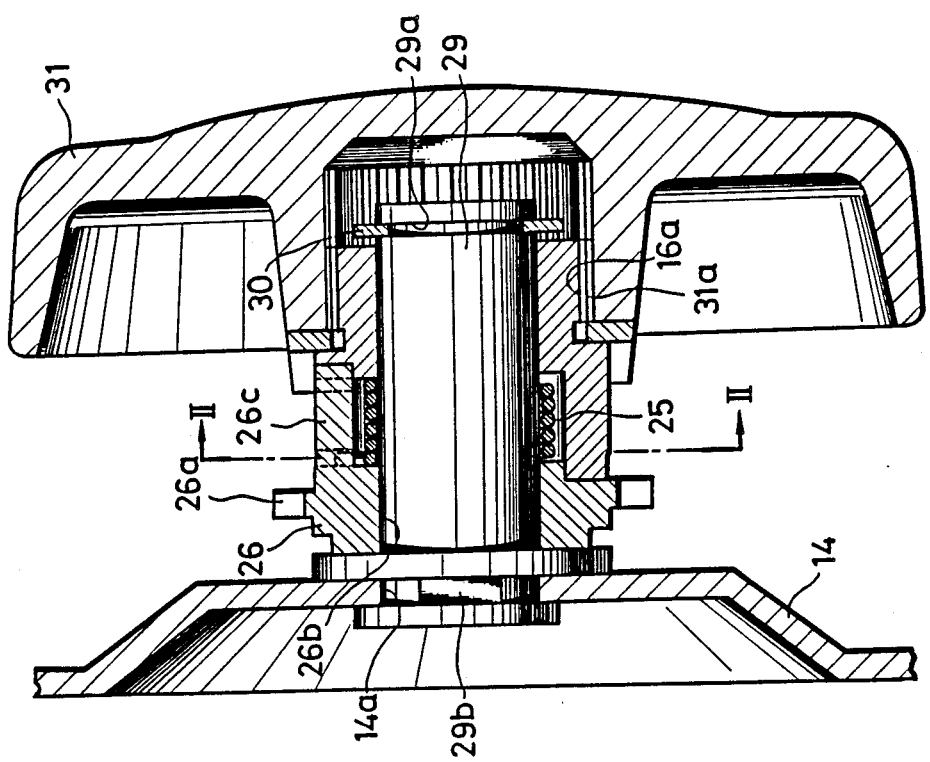
FIG. 3 is a sectional view taken along the line III—III in FIG. 1.

The reclining mechanism 20 has an upper bracket 13 secured to the seat back 11 and a lower bracket 14 secured to the seat cushion 12. The gear mechanism 15 includes an internal gear 21 provided on the upper bracket 13 and an external gear 22 formed in a plate 32 as shown in FIGS. 2 and 5. The internal gear 21 may be formed in the upper bracket 13 by means of pressing. In the illustrated embodiment, the upper bracket 13 is formed with a recess 21b and the internal gear 21 is formed in the inner peripheral wall of the recess 21b. The external gear 22 is formed in the plate 32 by pressing. In the illustrated embodiment, the plate 32 is formed with a cylindrical projection 22b and the external gear 22 is formed in the external peripheral wall of the projection 22b. The external gear 22 is engageable with the internal gear 21 and has gear teeth fewer in number than the gear teeth of the internal gear 21.

The plate 32 is secured to the lower bracket 14 by means of pins 27 with the projection 22b received in the recess 21b of the upper bracket 13. As shown in detail in FIG. 2, the lower bracket 14 is formed with pin receiving holes 28 whereas the plate 32 is formed with pin receiving holes 22c. The opposite ends of the pins 27 are inserted into those holes 28 and 22c.

There is provided an eccentric shaft 18 which is carried for rotation by the lower bracket 14. The eccentric shaft 18 includes a main shaft portion 18a and an eccentric shaft portion 18b. As shown in FIG. 5, the internal gear 21 is coaxially formed with a hole 21a whereas the external gear 22 is coaxially formed with a hole 22a. The shaft portions 18a and 18b are respectively engaged with the holes 21a and 22a so that the gears 21 and 22 are held in an eccentrically offset relationship. Thus, the external gear 22 engages the internal gear 21 at one circumferential region of the internal gear 21. The eccentric shaft 18 has a shaft portion 18c which coaxial with the main shaft portion 18a and carried by a bearing surface 24a of a bearing 24 provided on the lower bracket 14.

A driven sprocket 23 having a driven gear 23b is provided and secured to an end of the main shaft portion 18a of the eccentric shaft 18 to rotate with the eccentric shaft 18. For the purpose, the sprocket 23 is iormed with an elongated hole 23a which is engaged with the end of the shaft portion 18a. A clip 19 is provided for holding the sprocket 23 on the eccentric shaft 18.

The lower bracket 14 is further provided with a pivot shaft 29 which is secured to the lower bracket 14 by any suitable means against rotation. In the illustrated embodiment, the lower bracket 14 is formed with an elliptical hole 14a and the pivot pin 29 has a correspondingly shaped end 29b which is fitted to the hole 14a.

A driving sprocket 26 having a driving gear 26a is rotatably mounted on the pivot pin 29 by engaging its axial hole 26b with the pivot pin 29. An endless belt or chain 17 is passed around the gears 23b and 26a of the sprockets 23 and 26 to provide a power transmitting mechanism A which is adapted to transmit the rotation of the driving sprocket 26 to the driven sprocket 23. A constraining mechanism B is provided between the driving sprocket Z6 and the pivot pin 29 for preventing the rotation of the driving sprocket 26 under the force transmitted from the driven sprocket 23.

The constraining mechanism B includes a torsion coil spring 25 disposed around the pivot pin 29. The spring 25 has an inner diameter which.is slightly smaller than the diameter of the pivot pin 29. The spring 25 has opposite end portions 25a and 25b which are bent to extend radially outward. As shown in FIG. 2, the end portion 25a is located, as seen in the direction of convolution of the coil spring 25, at a position beyond the position where the end portion 25b is located. Therefore, the diameter of the spring 25 can be increased by moving the end portions 25a and 25b toward each other.

A knob shaft 16 having spline teeth 16a is mounted on the end of the pivot pin 29. The knob shaft 16 has an axial hole 16b with which the pivot pin 29 is engaged and a clip 30 is attached to the end of the pivot pin 29 to hold the knob shaft 16 in place. An actuating knob 31 is attached to the knob shaft 16 by engaging the attaching hole 31a to the spline teeth 16a of the knob shaft 16.

The knob shaft 16 is formed with a circumferential cutout 16c having opposite ends 16d and 16e which are adapted to receive the end portions 25a and 25b of the spring 25. It will therefore be understood that, when the actuating knob 31 is rotated, one of the ends 16d and 16e of the cutout 16c of the knob shaft 16 forces one of the end portions 25a and 25b of the spring 25 toward the other so that the coil spring 25 is loosened to allow rotation of the knob shaft 16 around the pivot pin 29. The driving sprocket 26 is formed with an axial projection 26c having opposite sides 26d and 26e, which is located between the end portions 25a and 25b of the spring 25. Thus, when the knob shaft 16 is rotated as described above, the rotation is transmitted from the knob shaft 16 to the driving sprocket 26 which in turn drives the driven sprocket 23 through the belt or chain 17. Therefore, the eccentric shaft 18 is rotated to rotate the internal gear 21 with respect to the internal gear 22. When the driving sprocket 26 is subjected to a rotational force transmitted from the driven sprocket 23 through the belt or chain 17, the axial projection 26c engages at one of its side edges 26d and 26e with corresponding one of the end portions 25a and 25b to force it away from the other so that the coil spring is tightened.

When it is desired to adjust the reclining angle of the seat back 11, the knob 31 is rotated. Then, the torsion coil spring 25 is loosened as previously described by having one of the end portions 25a and 25b forced toward the other through engagement with one of the ends 16d and 16e of the cutout 16c of the knob shaft 16. The one end 16d or 16e of the cutout 16c further engages corresponding one of the side edges 26d and 26e of the axial projection 26c on the driving sprocket 26 to transmit the rotation of the knob shaft 16 to the driving sprocket 26. The rotation of the driving sprocket 26 then causes a rotation of the driven sprocket 23 which produces a reclining movement of the upper arm 13 as previously described When the force on the actuating knob 31 is relieved, the torsion spring 25 is returned to its tightened position.

The load applied by the passenger on the seat back 11 tends to incline the seat back 11 and therefore the upper bracket 13. This force produces a tendency of rotating the eccentric shaft 18. Thus, a rotational force is transmitted from the driven sprocket 23 through the belt or chain 17 to the driving sprocket 26. However, the rotation of the driving sprocket 26 is prevented by the torsion coil spring 25 which is in the tightened position as described above. The axial projection 26c of the driving sprocket 26 engaged at one of its side ed8es 26d and 26e with corresponding one of the end portions 25a and 25b to force it away from the other to thereby tighten the spring further. Thus, the rotation of the driving sprocket 26 and therefore the reclining movement of the seat back 11 can positively be prevented.

The invention has thus been shown and described with reference to a specific embodiment, however, it should be noted that the invention is in no way limited to the details of the illustrated structures but changes and modifications may be made without departing from the scope of the appended claims.

We claim:

1. A seat back reclining mechanism comprising:
   an upper bracket supporting a seat back portion of a seat assembly and having a pivotal slot;
   a lower bracket supporting a seat cushion portion of said seat assembly, said upper bracket being pivotally attached to said lower bracket;
   internal gear means formed on said upper bracket and having inwardly directed gear teeth coaxially disposed about said pivotal slot;
   a disc plate secured to said lower bracket and having external gear means disposed in meshed engagement with said internal gear means, said disc plate having an axial aperture and said external gear means having outwardly directed gear teeth circumferentially disposed relative to said axial aperture, the number of said internal gear teeth being more than the number of said external gear teeth;
   first shaft means pivotally mounted on said lower bracket for pivoting said upper bracket relative to said lower bracket, said shaft means having a pair of coaxial portions and an eccentric portion extending therebetween, said eccentric portion mounted within said pivotal slot for rotatably supporting said upper bracket, one of said pair of coaxial portions extending within said axial aperture and the remaining one of said pair of coaxial portions being pivotally attached to said lower bracket;
   actuating means for controlling the pivoal movement of said first shaft means, said actuating means including:
   second shaft means fixedly mounted on said lower bracket;
   a drive sprocket rotatably mounted on said second shaft means and having an axial projection;
   a driven sprocket secured to said first shaft means for rotation therewith;
   power transmitting means for engaging said drive sprocket and said driven sprocket to rotate said driven sprocket in response to rotation of said drive sprocket;
   constraining means for preventing rotation of said drive sprocket by said power transmitting means in response to rotation of said driven sprocket, said constraining means including a knob member rotatably mounted on said second shaft means and an actuating member secured to said knob member to regulate the rotation of said knob member, said knob member having an axial extension coaxially disposed and radially spaced relative to said second shaft means, said axial extension defining a cutout for receiving said axial projection, said axial extension and said axial projection providing a substantially continuous annular surface, said constraining means also including a coil spring disposed along said second shaft means between said knob member and said drive sprocket, said coil spring having a normal diameter which is slightly less than the diameter of said second shaft means, said coil spring having opposing end portions disposed along opposite sides of said axial projectionu for engaging said axial extension along said cutout, each of said opposing end portions extending along opposite sides of said axial projection, so that rotation of said knob member expands the diameter of said coil spring enabing engagement between said axial extension and axial projection to rotate said drive sprocket, whereby rotation of said axial projection by said power transmitting means tightens said spring.

2. The seat back reclining mechanism defined in claim 1, wherein said power transmitting means is an endless belt extending around said first and second sprockets.

3. The seat back reclining mechanism defined in claim 1, wherein said power transmitting means is an endless chain extending around said first and second sprockets.

4. A seat back reclining mechanism comprising:
   an upper bracket supporting a seat back portion of a seat assembly and having first gear means;
   a lower bracket supporting a seat cushion portion of said seat assembly;
   a disc plate adapted to secure said upper bracket to said lower bracket and having a second gear means for engaging said first gear means;
   first shaft means pivotally mounted on said lower bracket for pivoting said upper bracket relative to said lower bracket;
   actuating means for controlling the pivotal movement of said first shaft means, said actuating means including:
   second shaft means fixedly mounted on said lower bracket;
   a drive sprocket rotatably mounted on said second shaft means and having an axial projection;
   a driven sprocket secured to said first shaft means for rotation therewith;
   power transmitting means for engaging said drive sprocket and said driven sprocket to rotate said driven sprocket in response to rotation of said drive sprocket;
   constraining means for preventing rotation of said drive sprocket by said power transmitting means in response to rotation of said driven sprocket, said constraining means including a knob member rotatably mounted on said second shaft means and an actuating member secured to said knob member to regulate the rotation of said knob member, said knob member having an axial extension coaxially disposed and radially spaced relative to said second shaft means, said axial extension defining to cutout for receiving said axial projection, said axial extension and said axial projection providing a substantially continuous annular surface, said constraining means also including a coil spring disposed along said second shaft means between said knob member and said drive sprocket, said coil spring having a normal diameter which is slightly less than the diameter of said second shaft means, said coil spring having opposing end portions disposed along opposite sides of said axial projection for engaging said axial extension along said cutout, each of said opposing end portions extending along opposite sides of said axial projection, so that rotation of said knob member expands the diameter of said coil spring enabling engagement between said axial extension and axial projection to rotate said drive sprocket, whereby rotation of said axial projection by said power transmitting means tightens said coil spring along said second shaft means.

5. The seat back reclining mechanism defined in claim 4, wherein said first gear means includes internal gear teeth and said second gear means includes external gear teeth meshed with said internal gear teeth, the numer of said internal gear teeth being more that the number of said external gear teeth, and wherein said first shaft means includes an eccentric portion for rotatably supporting said upper bracket.

6. The seat back reclining mechanism defined in claim 4, wherein said power transmitting means is an endless belt extending around said first and second sprockets.

7. The seat back reclining mechanism defined in claim 4, wherein said power transmiting means is an endless chain extending around said first and second brackets.

* * * * *